(12) United States Patent
Howard

(10) Patent No.: US 11,783,343 B2
(45) Date of Patent: Oct. 10, 2023

(54) TOKEN AGGREGATION FOR MULTI-PARTY TRANSACTIONS

(71) Applicant: Visa International Service Association, San Francisco, CA (US)

(72) Inventor: Kelvan Howard, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/351,142

(22) Filed: Jun. 17, 2021

(65) Prior Publication Data

US 2021/0312445 A1 Oct. 7, 2021

Related U.S. Application Data

(63) Continuation of application No. 15/185,949, filed on Jun. 17, 2016, now Pat. No. 11,068,899.

(51) Int. Cl.
*G06Q 20/40* (2012.01)
*G06Q 20/36* (2012.01)
(Continued)

(52) U.S. Cl.
CPC .......... *G06Q 20/405* (2013.01); *G06Q 20/28* (2013.01); *G06Q 20/326* (2020.05);
(Continued)

(58) Field of Classification Search
None
See application file for complete search history.

(56) References Cited

U.S. PATENT DOCUMENTS 5,280,527 A 1/1994 Gullman et al.
5,613,012 A 3/1997 Hoffman et al.
(Continued)

FOREIGN PATENT DOCUMENTS

EP 1028401 8/2000
EP 2156397 2/2010
(Continued)

OTHER PUBLICATIONS

"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.
(Continued)

*Primary Examiner* — Namrata Boveja
*Assistant Examiner* — Amit Patel
(74) *Attorney, Agent, or Firm* — Kilpatrick Townsend & Stockton LLP

(57) ABSTRACT

Described herein is a system for generating a master token to be associated with a set of tokens. In some embodiments, a number of tokens may be obtained by a communication device, which may be provided to a primary authorization computer. The primary authorization computer may generate a master token to be associated with each of those tokens. When the master token is used to complete a transaction, an authorization request may be received by the primary authorization computer that includes the master token. Upon receiving this, the primary authorization computer may obtain approval from a number of secondary authorization computers associated with the tokens, and may generate an authorization response based on those approvals.

19 Claims, 7 Drawing Sheets

(51) Int. Cl.
  *G06Q 20/32*  (2012.01)
  *G06Q 20/38*  (2012.01)
  *G06Q 20/28*  (2012.01)
  *G06Q 20/10*  (2012.01)
  *G06Q 50/12*  (2012.01)

(52) U.S. Cl.
  CPC ..... *G06Q 20/3226* (2013.01); *G06Q 20/3276* (2013.01); *G06Q 20/367* (2013.01); *G06Q 20/3678* (2013.01); *G06Q 20/385* (2013.01); *G06Q 20/3821* (2013.01); *G06Q 20/3829* (2013.01); *G06Q 20/102* (2013.01); *G06Q 20/322* (2013.01); *G06Q 50/12* (2013.01)

(56) References Cited

U.S. PATENT DOCUMENTS

| | | |
|---|---|---|
| 5,781,438 A | 7/1998 | Lee et al. |
| 5,883,810 A | 3/1999 | Franklin et al. |
| 5,914,472 A | 6/1999 | Foladare et al. |
| 5,930,767 A | 7/1999 | Reber et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |

(56) References Cited

U.S. PATENT DOCUMENTS

| | | |
|---|---|---|
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,751,642 B2 | 6/2014 | Vargas et al. |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko et al. |
| 9,680,942 B2 | 6/2017 | Dimmick |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0271262 A1 | 10/2009 | Hammad |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |

(56) References Cited

U.S. PATENT DOCUMENTS

| | | |
|---|---|---|
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191237 A1 | 8/2011 | Faith et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226802 A1 | 8/2013 | Hammad et al. |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |

(56) References Cited

U.S. PATENT DOCUMENTS

| | | |
|---|---|---|
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0172704 A1 | 6/2014 | Atagun et al. |
| 2014/0188586 A1 | 7/2014 | Carpenter et al. |
| 2014/0222663 A1 | 8/2014 | Park et al. |
| 2014/0249945 A1 | 9/2014 | Gauthier et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0073988 A1 | 3/2015 | Hosny et al. |
| 2015/0081346 A1 | 3/2015 | Charles |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0286998 A1 | 10/2015 | Thackray |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0324736 A1 | 11/2015 | Sheets et al. |
| 2015/0332262 A1 | 11/2015 | Lingappa |
| 2015/0356560 A1 | 12/2015 | Shastry et al. |
| 2015/0363781 A1 | 12/2015 | Badenhorst |
| 2015/0379516 A1 | 12/2015 | Yingst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi et al. |
| 2017/0148013 A1 | 5/2017 | Rajurkar et al. |
| 2017/0163617 A1 | 6/2017 | Laxminarayanan et al. |
| 2017/0163629 A1 | 6/2017 | Law et al. |
| 2017/0186001 A1 | 6/2017 | Reed et al. |
| 2017/0200156 A1 | 7/2017 | Karpenko et al. |
| 2017/0200165 A1 | 7/2017 | Laxminarayanan et al. |
| 2017/0201520 A1 | 7/2017 | Chandoor et al. |
| 2017/0220818 A1 | 8/2017 | Nagasundaram et al. |
| 2017/0221054 A1 | 8/2017 | Flurscheim et al. |
| 2017/0221056 A1 | 8/2017 | Karpenko et al. |
| 2017/0228723 A1 | 8/2017 | Taylor et al. |
| 2017/0236113 A1 | 8/2017 | Chitalia et al. |
| 2017/0293914 A1 | 10/2017 | Girish et al. |
| 2017/0295155 A1 | 10/2017 | Wong |
| 2017/0364903 A1 | 12/2017 | Lopez |
| 2017/0364914 A1 | 12/2017 | Howard |
| 2017/0373852 A1 | 12/2017 | Cassin et al. |
| 2018/0006821 A1 | 1/2018 | Kinagi |
| 2018/0075081 A1 | 3/2018 | Chipman |
| 2018/0247303 A1 | 8/2018 | Raj et al. |
| 2018/0262334 A1 | 9/2018 | Hammad |
| 2018/0268399 A1 | 9/2018 | Spector et al. |
| 2018/0268405 A1 | 9/2018 | Lopez |
| 2018/0285875 A1 | 10/2018 | Law et al. |
| 2018/0324184 A1 | 11/2018 | Kaja et al. |
| 2018/0324584 A1 | 11/2018 | Lopez |
| 2019/0020478 A1 | 1/2019 | Girish et al. |

(56) References Cited

U.S. PATENT DOCUMENTS

| | | | |
|---|---|---|---|
| 2019/0066069 A1 | 2/2019 | Faith et al. | |
| 2019/0147439 A1 | 5/2019 | Wang et al. | |

FOREIGN PATENT DOCUMENTS

| | | |
|---|---|---|
| WO | 0014648 | 3/2000 |
| WO | 0135304 | 5/2001 |
| WO | 0135304 | 5/2002 |
| WO | 2004042536 | 5/2004 |
| WO | 2004051585 | 6/2004 |
| WO | 2005001751 | 1/2005 |
| WO | 2006113834 | 10/2006 |
| WO | 2009032523 | 3/2009 |
| WO | 2010078522 | 7/2010 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |
| WO | 2017218138 | 12/2017 |

OTHER PUBLICATIONS

U.S. Appl. No. 15/185,949, Advisory Action, dated Nov. 19, 2020, 3 pages.
U.S. Appl. No. 15/185,949, Advisory Action, dated Nov. 7, 2019, 5 pages.
U.S. Appl. No. 15/185,949, Final Office Action, dated May 14, 2020, 10 pages.
U.S. Appl. No. 15/185,949, Final Office Action, dated Aug. 14, 2019, 38 pages.
U.S. Appl. No. 15/185,949, Non-Final Office Action, dated Feb. 26, 2019, 33 pages.
U.S. Appl. No. 15/185,949, Non-Final Office Action, dated Jan. 10, 2020, 40 pages.
U.S. Appl. No. 15/185,949, Notice of Allowance, dated Mar. 18, 2021, 10 pages.
U.S. Appl. No. 16/311,144, Encryption Key Exchange Process Using Access Device, Dec. 18, 2018, 83 pages.
Application No. PCT/US2017/033502, International Preliminary Report on Patentability, dated Dec. 27, 2018, 8 pages.
Application No. PCT/US2017/033502, International Search Report and Written Opinion, dated Aug. 29, 2017, 11 pages.
Application No. CN201780037337.1, Office Action, dated Dec. 2, 2022, 25 pages.
Application No. CN201780037337.1, Office Action, dated Jun. 29, 2023, 20 pages.

TOKEN AGGREGATION FOR MULTI-PARTY TRANSACTIONS

This application is a continuation application of U.S. application Ser. No. 15/185,949, filed Jun. 17, 2016, titled "TOKEN AGGREGATION FOR MULTI-PARTY TRANSACTIONS", which is herein incorporated by reference in its entirety for all purposes.

BACKGROUND

There are a number of problems that are present when multiple users attempt to conduct a single transaction. For example, when multiple users at a restaurant wish to contribute different amounts to a bill, the restaurant may receive different payment devices (e.g, different credit cards) from the different users. If, for example, the different users wish to pay for different amounts on the invoice, this can be unduly burdensome for the restaurant and the restaurant may consequently not want to perform the transaction in the manner that the users want. Additionally, the server may be responsible for multiple transactions, which may lead to mistakes in bill apportioning. While one user may provide a single payment device to pay for the multi-party transaction, the one user will need to seek reimbursement from each of the other users. This again often involves a number of communications between the different users and is inefficient.

Embodiments of the invention address these and other problems, individually and collectively.

BRIEF SUMMARY

Embodiments of the disclosure are directed to systems for obtaining a set of initial tokens to be used in completing a transaction, associating a master token with the set of initial tokens, and assigning portions of a transaction for which the master token has been provided to each initial token in the set of initial tokens. In some embodiments, multiple tokens may be obtained by a primary authorization computer. The primary authorization computer generates a master token upon obtaining the set of initial tokens. The master token may then be used to complete a transaction with a resource provider.

Upon receiving an authorization request that includes the master token, the primary authorization computer may determine a portion of the transaction to be assigned to each of the initial tokens in the set of initial tokens. The primary authorization computer may then generate secondary authorization requests to be sent to a number of secondary authorization computers associated with each initial token in the set of initial tokens. Upon receiving authorization responses from each of the secondary authorization computers, the primary authorization computer may generate an authorization response for the transaction.

One embodiment of the invention is directed to a method comprising receiving a set of initial tokens from a communication device, each initial token of the set of initial tokens associated with a different account, generating a master token to be associated with the set of initial tokens, and providing the master token to the communication device. The method further comprises receiving a request to authorize a transaction from a resource provider that includes the master token, generating, for each initial token in the set of tokens, a secondary authorization request message for a portion of the requested transaction, transmitting the generated secondary authorization request messages to secondary authorization computers associated with the respective initial tokens in the set of initial tokens. Upon receiving authorization response messages from the secondary authorization computers, generating subsequent authorization response messages and transmitting them to the resource provider.

Another embodiment of the invention is directed to a mobile device comprising a processor, a short range communication device, and a memory including instructions that, when executed with the processor, cause the mobile device to receive one or more initial tokens, each of which is associated with a different account, add, to the one or more tokens, an initial token associated with the mobile device, and associate, with the one or more initial tokens and the added initial token, a master token. The instructions further cause the mobile device to upon receiving a request to complete a transaction, provide the master token such that portions of the transaction are attributed to each of the one or more initial tokens.

Another embodiment of the invention is directed to a server device comprising a processor, and a memory including instructions that, when executed by the processor, cause the server device to maintain account information associated with a user, receive, from two or more applications, two or more initial tokens, each of the two or more initial tokens associated with a different account. The instructions, when executed by the processor, further cause the server device to generate a master token to be associated with the two or more initial tokens, and provide the generated master token to the user.

These and other embodiments of the invention are described in further detail below.

DETAILED DESCRIPTION

Figure 1:
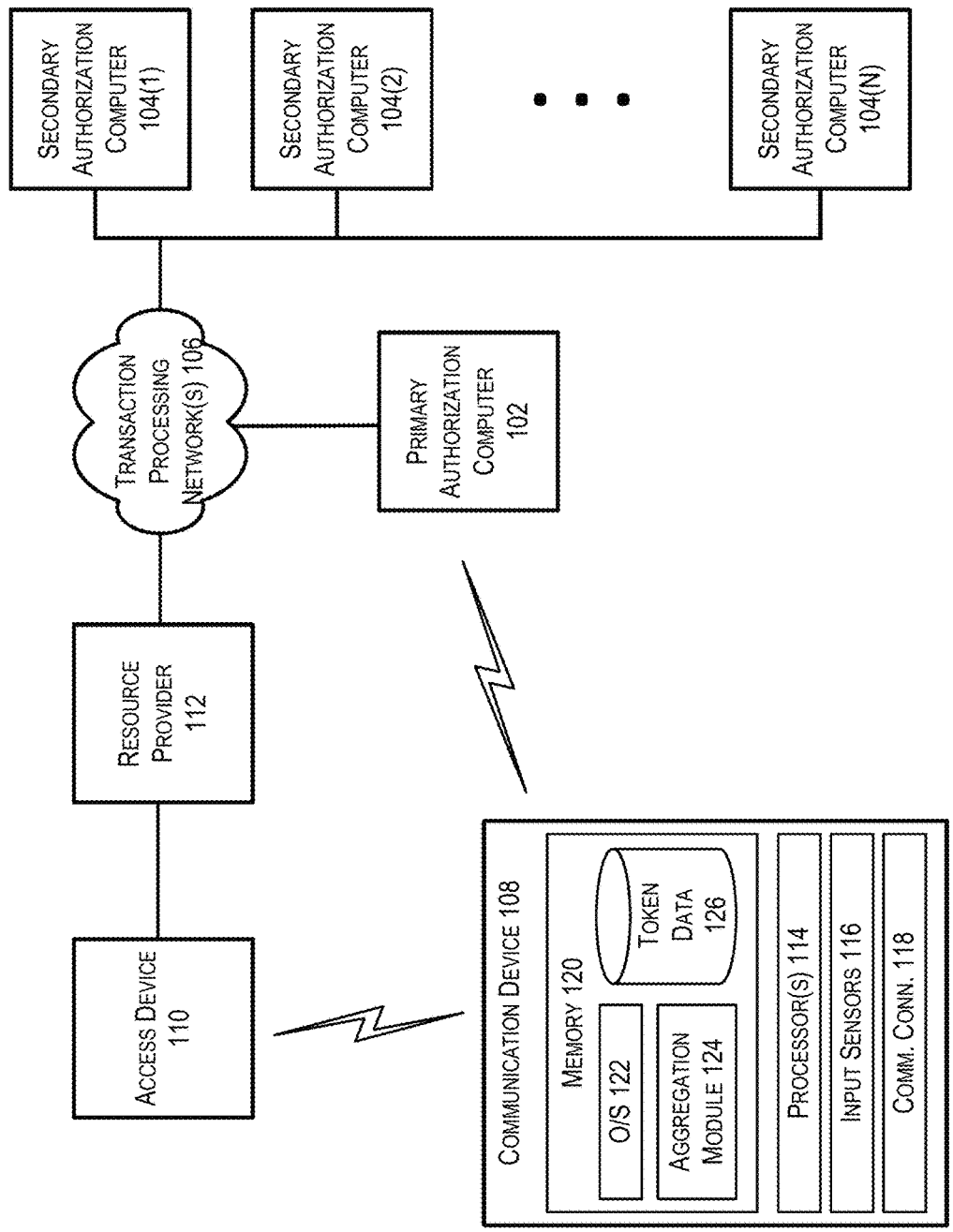
FIG. 1 depicts a block diagram of an example system architecture capable of implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "credential" may be any suitable information that serves as reliable evidence of worth, ownership, identity, or authority. A credential may be a string of numbers, letters, or any other suitable characters, as well as any object or document that can serve as confirmation. Examples of credentials include access credentials, value credentials, identification cards, certified documents, access cards, passcodes and other login information, etc.

An "access credential" may be any data or portion of data used to gain access to a particular resource. In some embodiments, an access credential may be a login and/or password for a user account. In some embodiments, an access credential may be include account information or a token associated with the account information, a cryptogram, a digital certificate, etc. A mobile device may store one or more access credentials associated with each communication device. In some embodiments, an access credential stored in association with a communication device may be used to conduct transactions on behalf of the communication device. In some embodiments, the mobile device may store a single access credential that may be used in each transaction initiated by the mobile device.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a communication device. In some embodiments, where an access device may comprise a POS terminal, any suitable POS terminal may be used and may include a reader, a processor, and a computer-readable medium. A reader may include any suitable contact or contactless mode of operation. For example, card readers can include radio frequency (RF) antennas, optical scanners, bar code readers, or magnetic stripe readers to interact with a communication device. In some embodiments, an access device may also be referred to as a terminal device.

"Account data" may refer to any content of an account of a user conducting a transaction. In some embodiments, account data may be payment account data that may be utilized to make a purchase. In other embodiments, account data may be any content associated with a user's non-financial account. For example, account data may include electronic files, photos, videos, and documents stored by the user's account. In some embodiments, account data may be stored by an authorization computer.

"Account information" may refer to any information surrounding an account of a user. For example, account information may include account data and one or more account identifiers. In some embodiments, the account identifier may be a PAN or primary account number. The PAN may be 14, 16, or 18 digits. Account information may also include an expiration date associated with the account, as well as a service code and/or verification values (e.g., CVV, CVV2, dCVV, and dCVV2 values).

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "communication device" may be any electronic device that has a primary function related to communication. A communication device may be capable of establishing a communication session with another electronic device and transmitting/receiving data from that device. In some embodiments, a communication device may act as a proxy device between two or more other electronic devices by establishing communication sessions with each of the devices and relaying information between the devices. A mobile device may be a type of communication device.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "token" may be a substitute for a real credential. In some embodiments, a token may include an identifier for a payment account that is a substitute for a real credential such as primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. In other embodiments, a token may be mathematically derived (e.g., with an encryption key) from the real credential. Further, in some embodiments, the token format may be configured to allow the entity receiving the token to identify it as a token and recognize the entity that issued the token.

A "master token" may be a type of token that may be a substitute for a token grouping (e.g., a set of initial tokens). A master token may be associated with a token grouping stored within a token vault. For example, a token grouping may include a plurality of tokens, each of which is associated with a separate account. In this example, a master token may be associated with the token grouping such that any time that the master token is used to complete a transaction, a portion of the transaction is allocated to each of the tokens in the token grouping. In some embodiments, a master token may be associated with configuration settings that indicate how a transaction should be apportioned to each token within the token grouping. The master token and the initial tokens that it relates to may all have the same format (e.g., 16, 18, or 19 numerical digits) in some embodiments of the invention.

A "mobile device" may be any computing device capable of traveling with a user. In some embodiments, a mobile device can include any suitable computing device configured to establish communication sessions with one or more communication devices and a resource provider (either directly or via a primary authorization computer) and (in some cases) to initiate transactions with the resource provider on behalf of the communication devices. In some embodiments, the mobile device may store one or more access credentials to be used in these transactions. In some embodiments, the mobile device may be configured to store one or more protocol sets related to transactions and/or communication devices. The mobile device may be further configured to confirm that transactions are in compliance with these transaction protocols prior to initiating the transactions.

A "primary authorization computer" may be any computing device that can authorize a request. The primary authorization computer may provide any suitable service and/or processing for obtaining a set of tokens, associating a master token with the set of tokens, and authorizing transactions in accordance with the disclosure. In some embodiments, the primary authorization computer may maintain an account for one or more users. The primary authorization computer may also store one or more configuration settings related to the authorization of transactions conducted using the master token.

A "secondary authorization computer" may be any computing device that can authorize a request. In some embodiments, a secondary authorization computer is configured to authorize authorization request messages including initial tokens. A secondary authorization computer may be owned and/or operated by an entity that is unaffiliated with the primary authorization computer.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

Details of some embodiments of the present invention will now be described.

FIG. 1 depicts an example system architecture capable of implementing at least some embodiments of the current disclosure. In FIG. 1, a primary authorization computer 102 may be in communication with one or more secondary authorization computers 104(1-N) via processing networks 106. The primary authorization computer 102 may also be in communication with a communication device 108. For example, as is described in greater detail elsewhere in the specification, the primary authorization computer 102 may receive initial tokens from the communication device 108 and may subsequently provide a master token to the communication device 108. The communication device 108 may, in turn, provide the master token to an access device 110 to complete a transaction. The access device 110 may be in communication with a resource provider computer 112, which may further be in communication with the primary authorization computer 102 via the processing network 106.

The primary authorization computer 102 may be any type of computing device, including a remotely located server computer, configured to manage a set of tokens and process and authorize transactions directed to the set of tokens. In some embodiments, the primary authorization computer 102 may perform one or more actions on behalf of the communication device 108. Additionally, it should be noted that in some embodiments, the primary authorization computer 102 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment. In some embodiments, the primary authorization computer 102 may be configured to provide a master token to the communication device 108. In some embodiments, a primary authorization computer may be a mobile application server that supports a mobile application installed on, and executed from, the communication device 108. In some embodiments, the primary authorization computer may be a server that supports mobile payment applications. For example, an e-wallet application may be installed on the communication device 108. In this example, the set of tokens may comprise a set of payment information account tokens.

A secondary authorization computer 104 may be any computing device or plurality of computing devices configured to receive an authorization request message for a transaction, authorize or decline the transaction, and provide an authorization response message based on whether the transaction has been authorized or declined. The secondary authorization computer 104 may determine whether to authorize or decline the transaction based on information associated with the transaction. In some embodiments, the transaction information may include an initial token that may be obtained from or derived from a real credential such as a real PAN. In some embodiments, the secondary authorization computer 104 may be operated by an issuer of a payment account (e.g., a credit card). As depicted in FIG. 1, there may be a number of secondary authorization computers 104 involved in the system, each of which may be owned and/or operated by a separate entity.

In some examples, the transaction processing network 106 may include any one or a combination of many different types of networks, such as cable networks, the Internet, wireless networks, cellular networks, and other private and/or public networks. In addition, the transaction processing network 106 may comprise multiple different networks. For example, the resource provider computer 112 may utilize a 3G network to communicate with a wireless router, which may then route the communication over a public network (e.g., the Internet) to the primary authorization computer 102. In some embodiments, the transaction processing network 106 may be an electronic payment network (e.g., VisaNet) or a combination of electronic payment networks.

The communication device 108 may be any electronic device configured to receive token information and provide information related to a master token to an access device 110 to conduct a transaction. In some embodiments, the communication device 108 may be a mobile phone or any other suitable portable electronic device. The communication device 108 may include a processor 114 capable of processing user input. The communication device 108 may also include one or more input sensors 116 for collecting input. In some embodiments, the input may include user provided input. Some non-limiting examples of input sensors 116 that may be included in a communication device include keyboards, mice, microphones, cameras, motion sensors, accelerometers, cameras, pressure sensors, thermometers, a global positioning system (GPS), a barcode reader, etc.

In some embodiments, the communication device 108 may include a communication interface 118 configured to enable communication between the communication device 108 and another electronic device (e.g., access device 110 and/or the primary authorization computer 102). Examples of communication interface 118 may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication interface 118 may include an infrared communication device. In some embodiments, the communication interface 118 may include both long range and short range communication means. For example, the communication interface may include an antenna configured to connect to a cellular network in order to enable communication with various other components of the depicted architecture.

In some embodiments, the communication technology used by the communication device 108 may depend on the type of power source used by the communication device. For example, if the device has access to a regular, external power supply, it may include a WiFi interface. Alternatively, if the device relies on a battery instead of an external power supply, it may include a means for communication that consumes less power, such as low power Bluetooth interface, a ZigBee interface, a near field communication (NFC) or radio frequency (RF) interface, or any other suitable wireless access interface.

Embodiments of one or more modules on the communication device 108 may be stored and executed from its memory 120. Turning to the contents of the memory 120 in more detail, the memory 120 may include an operating system 122 and one or more modules configured to cause the processor 114 to carry out instructions in accordance with at least some embodiments of the disclosure. For example, the memory 120 may include an aggregation module 124 configured to work with the processor 114 to receive token information from one or more external sources and initiate one or more transactions using a master token. Additionally, the memory 120 may include information related to one or more access credentials (token data 126).

In some embodiments, the aggregation module 124 may be programmed to cause the communication device 108 to receive one or more tokens from token sources, provide the one or more received tokens to a primary authorization computer 102, and receive a master token in return. The aggregation module 124 may also be programmed to cause the communication device 108 to provide the master token to an access device 110 to complete a transaction. In some embodiments, the aggregation module 124 may be implemented as an application installed on, and executed from, the communication device 108. In some embodiments, the primary authorization computer 102 may provide backend support for the aggregation module 124. For example, the primary authorization computer 102 may perform at least some processing tasks required by the aggregation module 124. In some embodiments, the aggregation module 124 may further include instructions for communicating securely with the primary authorization computer 102. For example, the aggregation module 124 may include encryption protocols and/or encryption keys utilized by the primary authorization computer 102.

The memory 120 of communication device 108 may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities. Sensitive information (e.g., token data 126 or other suitable access credential data) provisioned onto the communication device 108 may be stored in the secure memory.

The communication device 108 may also establish a connection with a primary authorization computer 102 that provides back end support for the communication device 108 by maintaining and managing token mappings. In some embodiments, upon initiation of a transaction by the user, the communication device 108 may transmit information related to the communication device 108 to the primary authorization computer 102. The primary authorization computer 102 may retrieve token information to be associated with the communication device 108 and/or transaction and may send that token information to the communication device 108. In this way, the token information may be provisioned onto the communication device 108. The token information may include an access credential (e.g., a master token), consumer identifier, access credential expiration conditions, and/or any other suitable information relevant to the communication device 108.

The access device 110 may be any computing device that controls access to a resource (e.g., a good or service). In some embodiments, the access device 110 may be owned and/or operated by a merchant or service provider. For example, the access device 110 may be a point of sale (POS) device (e.g., a cash register) used to complete transactions on behalf of the merchant or service provider.

Resource provider computer 112 may be a computing device configured to receive a transaction request and initiate a transaction. In some embodiments, the resource provider computer 112 may be associated with an electronic commerce site. For example, the resource provider may maintain a catalog of items and/or services available for purchase. The resource provider may also be associated with a utility company or other resource provider. In some embodiments, the resource provider may enable a user to pay a bill or other outstanding debt related to resource acquisition. The resource provider computer 112 may also be configured to complete a transaction upon receiving an authorization response message indicating that a transaction has been approved.

In some embodiments, the resource provider computer 112 may be in communication with an acquirer computer. An acquirer computer may be any computing device or plurality of computing devices configured to process transaction information received from the resource provider computer 112 and generate an authorization request message to be transmitted to the primary authorization computer 102. In some embodiments, the acquirer computer may be owned and/or operated by a banking institute with which the operator of the resource provider 110 maintains an account. In some embodiments, the resource provider may be an acquirer computer.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
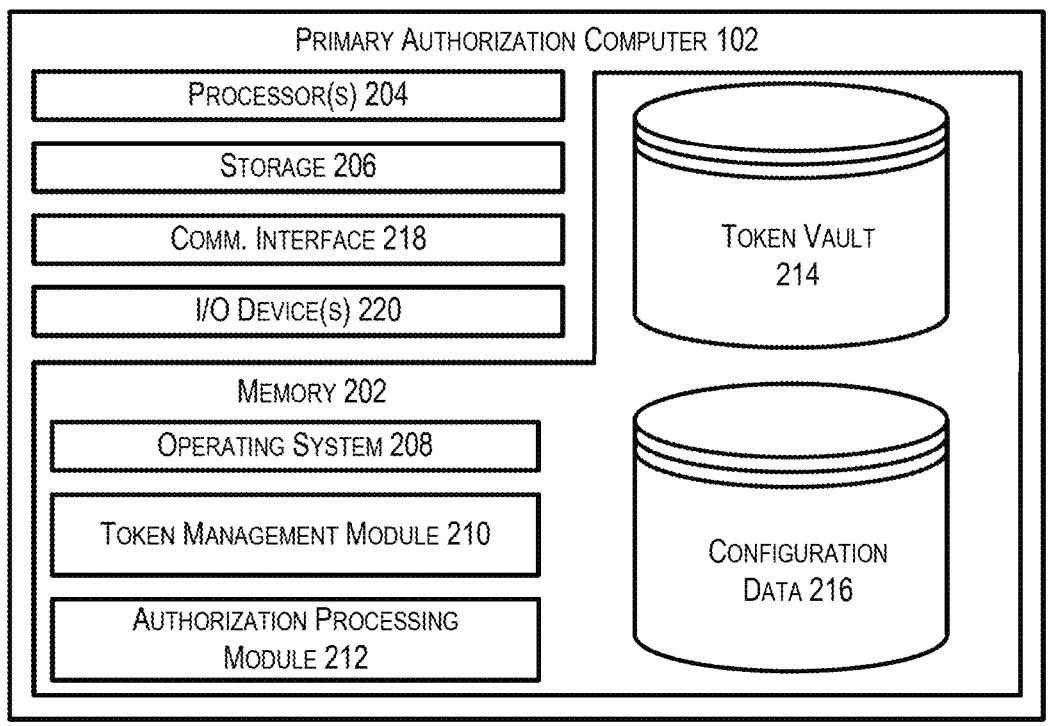
FIG. 2 depicts a diagram of an example primary authorization computer configured to store and manage access credentials and provide authorization for multiple-party transactions in accordance with at least some embodiments.

FIG. 2 depicts an example primary authorization computer 102 configured to store and manage access credentials and provide authorization for multiple-party transactions in accordance with at least some embodiments. The depicted primary authorization computer may be an example primary authorization computer 102 of FIG. 1.

As described above, the primary authorization computer 102 may be any type of computing device, including a remotely located server computer, configured to manage a set of tokens and process and authorize transactions directed to the set of tokens. In at least some embodiments, the computing device may include at least one memory 202 and a processing unit (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these program instructions. Depending on the configuration and type of computing device, the memory 202 may be volatile (such as random access memory (RAM)) and/or non-volatile (such as read-only memory (ROM), flash memory, etc.). The computing device may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the mobile device. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a token management module 210 for managing access credentials (e.g., sets of tokens and corresponding master tokens) and/or an authorization processing module 212 for responding to authorization requests in accordance with authorization requests received from secondary authorization computers. The memory 202 may also include a token vault 214, which provides data associated with one or more token relationships and configuration data 216, which provides information on transaction protocols for access credentials.

In some embodiments, the token management module 210 may, in conjunction with the processor 204, be configured to receive tokens from a communication device and store the received tokens as a token grouping in a token vault. The token management module 210 may also, in conjunction with the processor 204, be configured to generate a master token to be associated with the token grouping within the token vault and provide the master token to the communication device in response to receiving the tokens. In some embodiments, the master token may be mathematically derived from the initial tokens that are associated with it. In other embodiments, there is no mathematical relationship between the master token and the initial tokens that are associated with it.

In some embodiments, the authorization processing module 212 may, in conjunction with the processor 204, be configured to receive an authorization request from a resource provider that includes a master token, determine a token grouping associated with the master token, generate secondary authorization requests to secondary authorization computers associated with each of the tokens in the token grouping, and generate an authorization response in accordance with secondary responses received from each of the secondary authorization computers. In some embodiments, the authorization processing module 212 may also, in conjunction with the processor 204, be configured to determine a portion of a transaction to be assigned to each token within a token grouping.

The primary authorization computer 102 may also contain communications interface(s) 218 that enable the primary authorization computer 102 to communicate with a stored database, another computing device or server, one or more terminal devices, communication devices, and/or other electronic devices on a network.

The primary authorization computer 102 may also include input/output (I/O) device(s) and/or ports 220, such as for enabling connection with a keyboard, a mouse, a pen, a voice input device, a touch input device, a display, speakers, a printer, etc.

Figure 3:
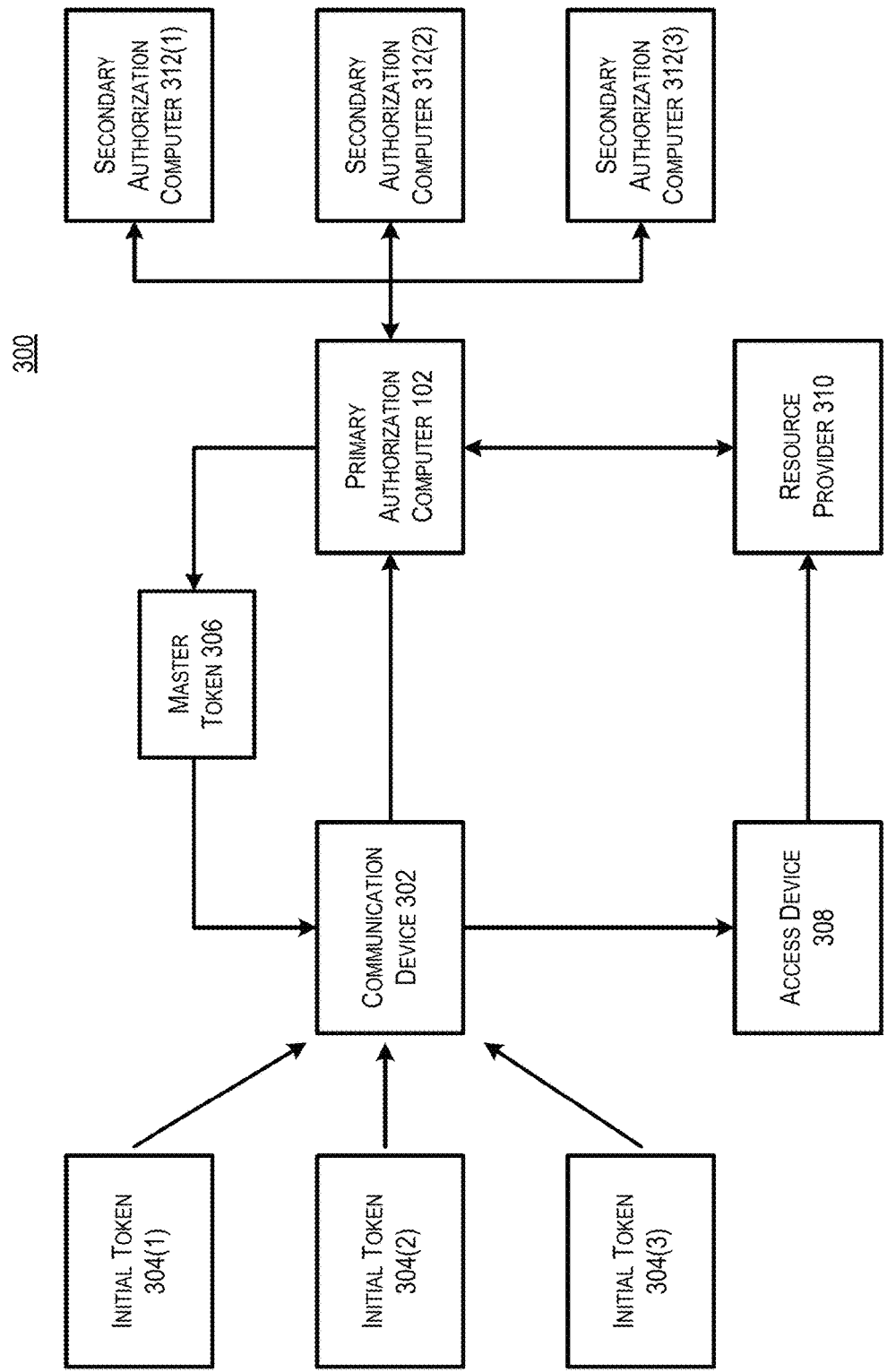
FIG. 3 depicts a block diagram of an example data flow that may be implemented in accordance with at least some embodiments.

FIG. 3 depicts an example data flow 300 that may be implemented in accordance with at least some embodiments. The data flow depicted in FIG. 3, may be implemented at least by the components of the example architecture depicted in FIG. 1.

In data flow 300, a communication device 302 operated by a first user may receive tokens 304 from a number of token sources. In some embodiments, the communication device 302 may receive tokens from other communication devices (not shown) operated by other users. For example, each of the other communication devices may transmit an initial token to the communication device 302. In some embodiments, this transmission may occur via a short range communication mechanism such as near-field communications (NFC), Bluetooth, Bluetooth low-energy (BLE), wireless local area network (WLAN) (e.g., WiFi), iBeacon, ZigBee, radio frequency (RF), infrared transmission (IR), or any other suitable means of communicating at close proximity. In some embodiments, the communication device 302 may include a barcode reader and tokens may be received by scanning a machine readable code displayed on the other communication devices.

The communication device 302 may send the received initial tokens 304 to a primary authorization computer 102. In some embodiments, the initial tokens 304 may be aggregated into a set of initial tokens and provided to the primary authorization computer 102. In some embodiments, the initial tokens may be provided to the primary authorization computer 102 as they are received by the communication device 302. The primary authorization computer 102 may also receive an indication that each of the received initial tokens 304 is to be stored in relation to the same master token. For example, a user may, upon executing an aggregation module stored in memory of the communication device 302, interact with a graphical user interface (GUI) to initiate creation of a token grouping. The communication device 302 may then initiate collection of the initial tokens 304 from the various token sources. Upon collecting all of the initial tokens 304 to be included in a token grouping, the user may indicate that all initial tokens 304 have been received. The received initial tokens may then be stored by the primary authorization computer 102 as a token grouping within a token vault. In addition, the primary authorization computer 102 may add an initial token associated with the user of the communication device 302 to the token grouping.

Once the creation of the token grouping has been initiated (or once a token grouping has been created), the primary authorization computer 102 may generate a master token 306. The master token 306 is stored in relation to the token grouping maintained by the primary authorization computer 102. Upon generation of the master token 306, it may be provided to the communication device 302 by the primary authorization computer 102. In some embodiments, the master token 306 may be provided to a specific application installed on the communication device 302. For example, the communication device 302 may include an e-wallet application that includes the aggregation module and is configured to cause the communication device 302 to transmit the master token 306 to an access device 308 in order to complete a transaction.

After receiving the master token 306, the communication device 302 may provide the master token 306 to an access device 308 to conduct a transaction. For example, a merchant may initiate a transaction for goods and or services with the user of the communication device 302. The user may present the master token 306 to the merchant via the access device 308 in order to complete the transaction. Upon receiving the master token 306, the access device 308 may communicate the master token 306 to a resource provider computer 310. The resource provider computer 310 may subsequently generate an authorization request message that include information related to the transaction as well as the master token 306. The authorization request message may then be provided to the primary authorization computer 102 (e.g., via a transaction processing network).

Upon receiving an authorization request message that includes the master token 306, the primary authorization computer 102 may identify the token grouping associated with the master token 306 by querying the token vault. Once the token grouping has been identified, secondary authorization computers 312 may be identified for each of the initial tokens in the token grouping. In some cases, the secondary authorization computer 312 may be the same for multiple tokens within the token grouping. The primary authorization computer 102 may subsequently generate secondary authorization request messages to each of the identified secondary authorization computers 312 for each token in the token grouping, the secondary authorization request messages each being for authorization of a portion of the transaction and each containing at least an initial token that is associated with the master token. In some embodiments, the portion of the transaction allocated to each token may be determined based on configuration settings stored in relation to the token grouping. This will be described in greater detail elsewhere in the specification. The generated secondary authorization request messages may be provided to each of the relevant secondary authorization computers via one or more transaction processing networks.

The primary authorization computer 102 may receive, from each of the secondary authorization computers 312, an secondary authorization response message indicating whether the corresponding portion of the transaction is approved. Prior to doing so, each secondary authorization computer 312 may determine the real credentials (e.g., primary account numbers) are associated with the initial token in the authorization request message that is received. The secondary authorization computer 312 may do this by searching its own initial token vault or reaching out to an external token vault. Using the real credentials, the secondary authorization computer 312 may determine if the transaction is authorized by authenticating information in the authorization request message and/or the user, and determining if there are sufficient funds in the account associated with the real credential. In other embodiments, if the secondary authorization computer 312 is a payment processor, then the secondary authorization computer 312 may then generate another authorization request message with the real credential and may then forward that authorization request message to an issuer of the real credential for approval.

Upon receiving secondary authorization response messages for all of the generated secondary authorization request messages, the primary authorization computer 102 may generate an authorization response message to the received authorization request message to be provided to the resource provider computer 310. If each of the received secondary authorization request messages indicate that their portion of the transaction is approved, then the primary authorization computer may generate a subsequent authorization response message indicating that the transaction is approved. If, on the other hand, one or more of the received secondary authorization response messages may indicate that a portion of the transaction is declined, then the authorization response message generated by the primary authorization computer 102 may indicate that the transaction is declined. In some embodiments, the primary authorization computer 102 may provide a notification to the communication device 302 indicating any declined portion of the transaction.

In other embodiments, if the secondary authorization computer 312 is a payment processor, then the secondary authorization computer 312 may receive an authorization response message with the real credential from the issuer of the real credential, and may then forward that authorization response message with the real credential to the primary authorization computer 102.

Figure 4:
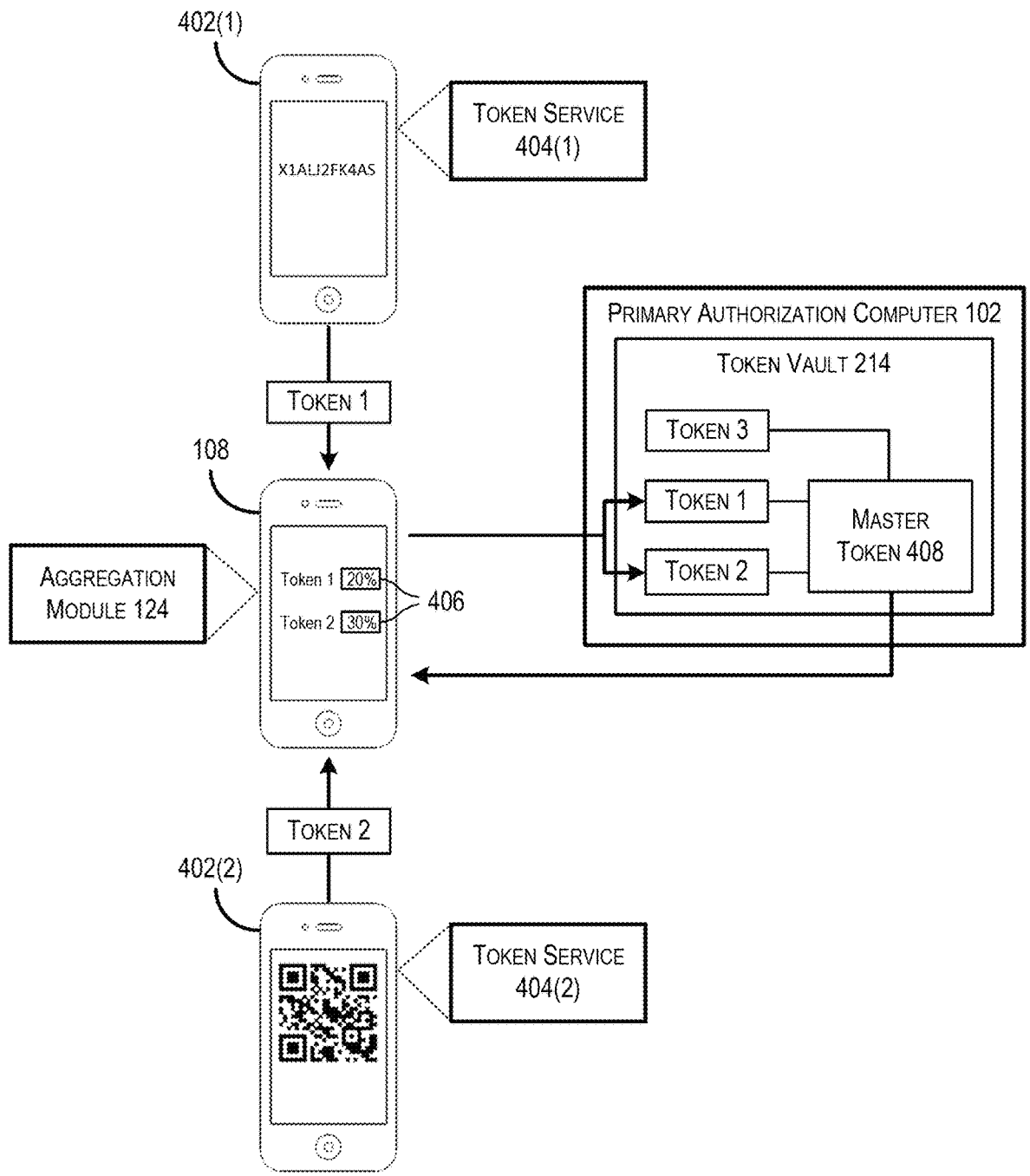
FIG. 4 depicts a process for aggregating tokens into a token grouping and generating a master token associated with the token grouping in accordance with at least some embodiments.

FIG. 4 depicts a process for aggregating initial tokens into a token grouping and generating a master token associated with the token grouping in accordance with at least some embodiments. In FIG. 4, a communication device 108 may be in communication with one or more token sources 402, which may provide initial tokens to the communication device 108. In some embodiments, the initial token sources may be separate communication devices. Each of the initial token sources 402 may be associated with a token service 404. For example, in the case that each of the initial token sources 402 is a mobile device, each mobile device may have installed a token service application (e.g., an ewallet application). The token service applications installed on each mobile device may be different, or they may be a separate instance of the same token service application. Token service 404 may be any system capable of being used to generate, process, and maintain tokens and related account information such as dynamic keys.

By way of illustrative example, in a first scenario, a first mobile device may have installed a Visa Mobile Payments application configured to provide a Visa token in order to complete a transaction. A second mobile device may include an Android Pay application configured to provide an Android Pay token in order to complete a transaction. In this scenario, the first mobile device may provide a Visa token to the communication device 108 and the second mobile device may provide an Android Pay token to the communication device 108. In a second scenario, both a first and second mobile device may have an instance of a Visa Mobile Payments application installed. In this scenario, each of the mobile devices may provide different Visa tokens to the communication device 108.

Initial tokens may be conveyed to the communication device 108 in a variety of ways. For example, in some cases, the initial token may be transmitted to the communication device via a short-range wireless communication protocol. In another example, the initial token may be displayed on a display screen of a communication device as a machine-readable code, from which it may be scanned by a barcode scanner included in the communication device 108. In another example, an initial token may be manually entered (e.g., keyed) into the communication device 108. In this example, a token source 402 may display an initial token and a user may be required to enter the initial token into a field of a GUI executed on the communication device 108. In some embodiments, an initial token may be conveyed to the communication device via a text message or email communication.

Receipt of the initial tokens by a communication device 108 may be initiated by a user via execution of a mobile application installed on the communication device 108. For example, the user may execute a mobile application (e.g., an e-wallet application) installed on the communication device 108. Upon execution of the mobile application, the user may be prompted to at least select an existing master token to be used in a transaction or to create a new token grouping to be associated with a new master token to be used in future transactions. Upon selecting the option to create a new grouping, the mobile application may cause various input sensors installed on the communication device 108 to monitor for incoming token information. In some embodiments, the user may specify the way in which a token is to be received by the communication device 108. For example, the user may initiate a barcode reader in communication with the mobile application. Each token received by the communication device 108 may subsequently be provided to the authorization computer 102.

In some embodiments, an initial token associated with the user of the mobile device (e.g., depicted as token 3) may be added to the token grouping. For example, in some embodiments, a default token may be added to each token grouping affiliated with a particular user or communication device 108 that represents an account to be used by that user. In some embodiments, a user may select an account to be associated with the token grouping and an initial token associated with that account may be added to the token grouping.

Upon receiving the initial tokens, a user may be provided with the ability to provide configuration settings to be associated with a token grouping. For example, the user may be given, via the GUI, an ability to indicate a portion of future transactions 406 that should be associated with each received initial token. In some embodiments, the user may select a percentage or fraction to be associated with each initial token within the initial token grouping. In some embodiments, a user may select a maximum, minimum, or exact amount to be assigned to a particular token. In some embodiments, one token may be associated with a remainder for each transaction (e.g., any portion of a transaction left unassigned). In some embodiments, the user may be required to assign portions to each initial token in the token grouping such that the assigned portions total the entire transaction. In some embodiments, the configuration settings may include a default that dictates portions of a transaction are to be assigned so that they are evenly proportioned to each token in the token grouping unless otherwise indicated.

The primary authorization computer 102 may store the initial tokens received from the communication device 108 in a token vault 214 as a token grouping. A master token may be generated and may be associated with the token grouping. Specifically, token vault 214 may maintain a mapping between a master token and the set of initial tokens represented by the master token. During transaction processing, token vault 214 may be queried to retrieve the set of tokens associated with the master token. Upon its creation, the master token 408 may be provided to the communication device 108.

In some embodiments, a user may be provided the ability to add initial tokens to, remove tokens from, or otherwise update, the token grouping. For example, the user may be provided with the ability to select an initial token to be removed from the token grouping via the communication device 108 or another client device. In this example, a new master token may or may not be generated. In addition, the user may be provided with the ability to edit the configuration settings stored in relation to the token grouping. For example, the user may edit a percentage portion of a future transaction that will be assigned to each token in the token grouping.

In some embodiments, the master token and/or the token grouping may be associated with a user account maintained by the primary authorization computer 102. A user may access information from the user account by logging into a secure network site hosted by the primary authorization computer 102 or another server associated with the primary authorization computer 102. For example, the user may log into his or her account via a website operated on behalf of the primary authorization computer 102. In another example, the user may log into his or her account via a mobile application installed on, and executed by, the communication device. In this example, the mobile application may be instantiated and/or operated on behalf of the primary authorization computer 102. The user may be provided with the ability to edit token groupings, edit configuration settings associated with token groupings, create a new token grouping, request a new master token, set up automatic payments using a master token, or make any other suitable changes to the user account.

Figure 5:
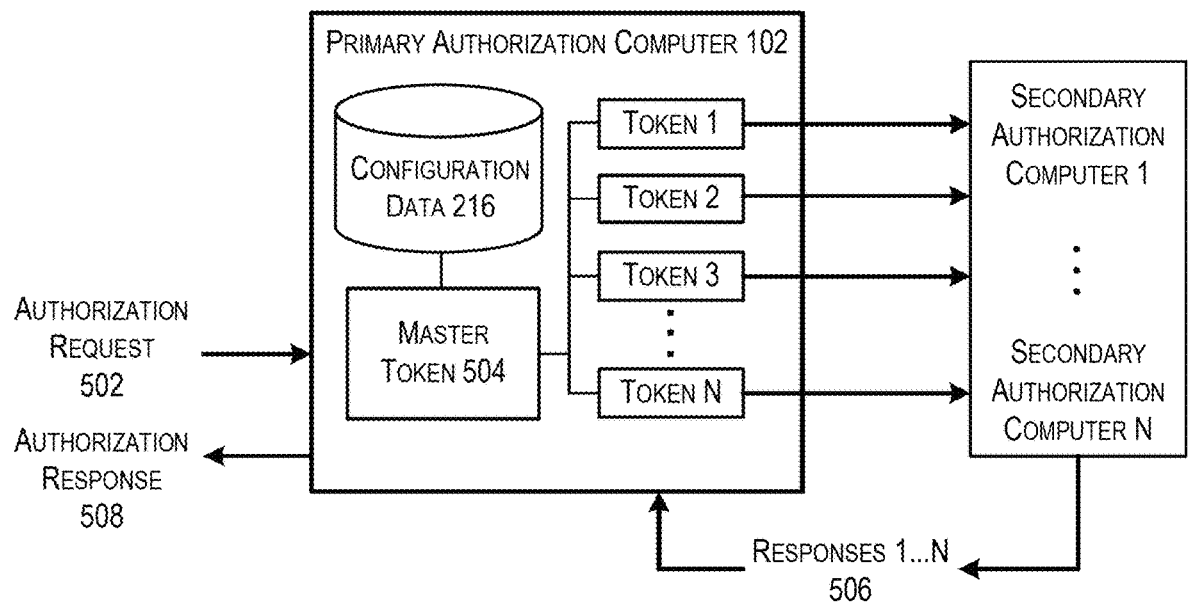
FIG. 5 depicts a process for handling an authorization request message that includes a master token in accordance with at least some embodiments.

FIG. 5 depicts a process for handling an authorization request message that includes a master token in accordance with at least some embodiments. The primary authorization computer 102 depicted in FIG. 5 may be an example primary authorization computer 102 of FIG. 1.

The primary authorization computer 102 may receive an authorization request 502 associated with a transaction to be completed. As described elsewhere in this specification, the authorization request message 502 may be received from a resource provider computer. Upon receiving the authorization request message, the primary authorization computer 102 may identify a master token 504 within the request. For example, the authorization request may comprise particular data fields and may be in a particular format. In this example, the authorization request message 502 may identify the master token 504 with a specified data field.

Once the primary authorization computer 102 has identified the master token associated with the authorization request message, it may query a token vault for a token grouping associated with the master token 504. In some embodiments, the primary authorization computer 102 may also query configuration data 216 to identify a set of configuration settings associated with the master token 504. Once the primary authorization computer has identified the relevant token grouping and configuration settings, it may determine an appropriate portion of the transaction to be associated with each token and may subsequently generate secondary authorization request messages for each of the initial tokens in the identified token grouping.

The primary authorization computer 102 may determine an appropriate portion of the transaction to be associated with each initial token according to the identified configuration settings. For example, a set of configuration settings may indicate a percentage, fraction, or dollar amount to be associated with each token within the token grouping. In some embodiments, the primary authorization computer 102 may assign an equal portion of the transaction to each of the tokens in the token grouping. In some embodiments, the primary authorization computer 102, upon receiving the authorization request message 502, may communicate information related to the transaction to a user associated with the master token and may subsequently receive, from the user, an assignment of portions of the transaction for each initial token in the token grouping.

In some embodiments, the portions of the transaction assigned to each initial token in the token grouping may sum to an amount that is greater than the transaction itself. For example, the primary authorization computer 102 may charge an additional fee for the use of the token aggregation service, which may be distributed amongst the initial tokens in the token grouping. In another example, the primary authorization computer 102 may identify any relevant service fees that will be charged by each of the secondary authorization computers that maintain the tokens. These fees may be aggregated by the primary authorization computer 102 and it may be determined whether the fees are greater than a maximum fee threshold (e.g., the most that the originator of the authorization request 502 should be charged for using the service). If the aggregated fees are greater than the maximum fee threshold, then any overage may also be distributed amongst the tokens in the token grouping.

For each of the initial tokens 1-N in the token grouping, the primary authorization computer 102 may generate an authorization request message to be sent to a secondary authorization computer associated with that initial token. In some embodiments, the primary authorization computer 102 may generate each secondary authorization request for the portion of the transaction determined to be assigned to the initial token associated with the secondary authorization request. In some embodiments, a secondary authorization request may be generated by the primary authorization computer 102 for an amount greater than its determined portion of the transaction. For example, the primary authorization computer 102 may seek to gain pre-approval using an initial token for an amount greater than the portion of the transaction assigned to that initial token.

In some embodiments, the primary authorization computer 102 may include information indicating the originator of the authorization request message in each secondary authorization request message. For example, if an authorization request message is received by the primary authorization computer 102 from Restaurant A, then the secondary authorization requests generated by the primary authorization computer may each indicate that the originator is Restaurant A. This enables the users to better track purchases and allows users to participate in programs that reward users for shopping at specific merchants or types of merchants. In some embodiments, the originator of the authorization request may be removed from the secondary authorization requests. This would enable a user to increase the privacy of his or her purchase history by preventing visibility of embarrassing purchases. In some embodiments, these settings may be included in the configuration settings editable by the user.

After transmitting secondary authorization requests to each relevant secondary authorization computer, the primary authorization computer 102 may monitor responses 506. Upon receiving a response 506 for each of the generated secondary authorization requests, the primary authorization computer 102 may determine a status for the transaction and may generate an authorization response 508. For example, if each of the responses is an approval, then the primary authorization computer 102 may generate an authorization response message 508 that indicates that the transaction is approved. If one or more of the responses 506 indicates that a portion of the transaction is declined, then the primary authorization computer 102 may generate an authorization response message 508 that indicates the transaction is declined.

Figure 6:
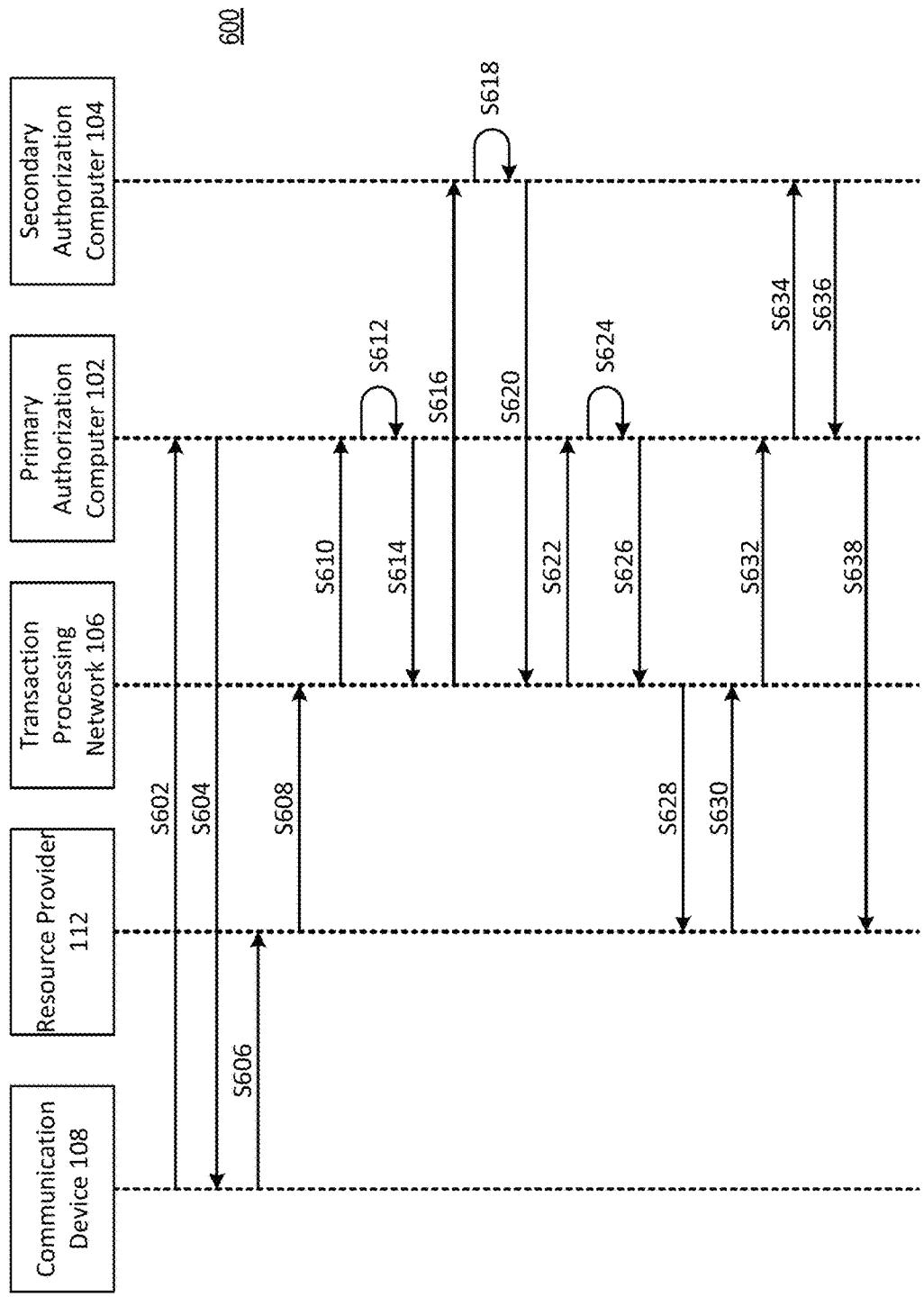
FIG. 6 depicts a process flow for conducting and settling a multi-party transaction with a resource provider using a master token in accordance with at least some embodiments.

FIG. 6 depicts a process flow 600 for conducting and settling a multi-party transaction with a resource provider using a master token in accordance with at least some embodiments. In process flow 600, a communication device 108 may be in communication with a primary authorization computer 102. For example, the communication device 108 may have an e-wallet application installed, that when executed, establishes a communication session with an e-wallet service provider executed on the primary authorization computer 102. The communication device may be configured to communicate with an access device in communication with a resource provider computer 112. The resource provider computer 112 may be in communication with the primary authorization computer 102 via a transaction processing network 106. The primary authorization computer 102 may be in communication with a number of secondary authorization computers 104 via the transaction processing network 106.

The process flow 600 may begin at S602, when the communication device 108 provides a set of initial tokens to the primary authorization computer 102. In some embodiments, the communication device 108 may communicate the set of initial tokens over a communication session encrypted using an encryption protocol specific to the e-wallet application. Upon receiving the set of initial tokens, the primary authorization computer 102 may store the set of initial tokens in a token vault maintained by the primary authorization computer 102. The primary authorization computer 102 may generate a master token to be mapped to the set of initial tokens within the token vault. In some cases, the initial tokens that were received by the communication device 108 from external token sources may be automatically deleted after a predetermined period of time.

At S604, the primary authorization computer 102 may transmit the master token to the communication device 108. In some embodiments, the master token may be provided to the communication device via the same communication session established above. In some embodiments, the primary authorization computer 102 may establish a new communication session over which the master token is to be provided to the communication device 108. In some embodiments, the master token may be encrypted using a different encryption key than that which the set of tokens were encrypted.

At S606, the communication device 108 may provide the master token to a resource provider computer 112 (e.g., via an access device) to complete a transaction. For example, the communication device 108 may present the master token to an access device (e.g., via a contactless reader) to complete a transaction. The access device may transmit the master token, as well as transaction information, to the resource provider computer 112 to initiate the transaction.

At S608, the resource provider computer 112 may generate an authorization request message associated with the transaction. The generated authorization request message may include the master token as well as information related to the transaction to be completed. The generated authorization request may be provided to a transaction processing network 106 to be routed to an appropriate primary authorization computer 102.

At S610, the transaction processing network 106 may, upon receiving the authorization request, determine the primary authorization computer 102 is the authorizing entity for the received transaction request. In some embodiments, the transaction processing network 106 may make this determination based on a format of the master token included within the authorization request message. Upon determining that the primary authorization computer 102 is the authorizing entity for the authorization request message, the transaction processing network 106 may route the authorization request message to the primary authorization computer 102.

At S612, the primary authorization computer may identify the master token within the received authorization request message and may query the token vault for the set of tokens associated with the master token. The primary authorization computer 102 may then determine an appropriate portion of the transaction to be associated with each token in the set of tokens and may subsequently generate secondary authorization request messages for each initial token in the set of initial tokens. Each of the generated secondary authorization request messages may include its associated initial token as well as some or all of the information related to the transaction. In some embodiments, each secondary authorization request may include an identifier (e.g., a transaction identifier or the master token) that is used to map the secondary authorization request to the transaction. In some embodiments, each of the generated secondary authorization requests may include different identifiers. In some embodiments, an identifier included in a secondary authorization request may be formatted to include a transaction identifier followed by a token identifier. For example, if the transaction identifier is 12345678 and the token identifier is C, then the secondary identifier may be 12345678C, indicating that it is related to token C from transaction 12345678. This identifier may be used to map each of the secondary request messages generated to its corresponding transaction and/or token.

At S614, the primary authorization computer 102 may provide the generated secondary authorization request messages to the transaction processing network 106 to be routed to their appropriate secondary authorization computers 104. Upon receiving the requests, the transaction processing network 106 may determine an appropriate secondary authorization computer 104 for each of the secondary authorization requests. In some embodiments, the transaction processing network 106 may make this determination based on a format of the token included in each of the secondary authorization request messages.

At S616, the transaction processing network may route each of the secondary authorization request messages to its corresponding secondary authorization computer 104. In some embodiments, multiple secondary authorization request messages may be routed to the same secondary authorization computer 104 for separate authorization. In some embodiments, some or all of the secondary authorization requests may be routed to different secondary authorization computers 104 for authorization.

At S618, each of the secondary authorization computers 104 may resolve the initial tokens into their associated real credentials and may determine whether or not to approve the portion of the transaction associated with the secondary authorization request. For example, the secondary authorization computer 104 may decline the secondary authorization request if there is a high likelihood of fraud. In another example, the secondary authorization computer 104 may decline the transaction if a payment account associated with the token included in the secondary authorization request has insufficient funds. The secondary authorization computers 104 may generate authorization response messages based on whether the portion of the transaction is to be approved or declined. Each of the generated authorization responses may represent pre-approval for a portion of the transaction. In some embodiments, an identifier that was present in the secondary request message may be included in the secondary response message so that the secondary response message may be tied to its corresponding transaction by the primary authorization computer 102.

At S620, each of the secondary authorization computers 104 may provide the generated authorization response message to the transaction processing network 106 to be routed to the primary authorization computer 102. Upon receipt, the transaction processing network 106 may route each of the received authorization responses to the primary authorization computer 102 at S622.

At S624, the primary authorization computer 102 may monitor for, and assess, each authorization response received in order to determine if the transaction is to be approved. The primary authorization computer 102 may map each secondary response message to its corresponding transaction via the identifier included in the secondary response message. In some embodiments, the primary authorization computer 102 may decline the transaction if one or more portions of the transaction are declined. In some embodiments, the primary authorization computer may determine that the transaction should be approved as long as it is an amount that is greater than a total amount associated with the transaction. For example, the portions of the transaction associated with each token may sum to an amount greater than an amount associated with the transaction itself. In this example, the primary authorization computer may approve the transaction as long as an amount associated with the approved authorization responses are sufficient to cover the amount of the transaction.

At S626, the authorization response message may be transmitted to the transaction processing network 106. Upon receiving the authorization response message, the transaction processing network 106 may route the authorization response message to the resource provider computer 112 at S628.

At S630, a settlement and clearing process may be initiated by the resource provider computer 112. In the settlement and clearing process, the resource provider computer 112 (or an acquirer associated with the resource provider that operates the resource provider computer 112) may provide a request for funds to be transferred to an account associated with and/or maintained by, the resource provider. The request for funds may be provided to the primary authorization computer 102. In some embodiments, the request may be provided directly to the primary authorization computer 102. In some embodiments, the request may be provided to the transaction processing network 106 and forwarded to the primary authorization computer 102 at S632.

At S634, upon receiving the request for funds, the primary authorization computer 102 may generate separate requests for funds to be provided to each of the secondary authorization computers. The separate requests for funds may each be for the portion of the transaction associated with each of the tokens. The requests for funds may be sent to each of the secondary authorization computers associated with those tokens. In some embodiments, the separate requests for funds may include instructions to transfer funds to an account associated with and/or operated by the primary authorization computer. In some embodiments, the requests for funds may include instructions to transfer funds directly to the account associated with the resource provider computer 112.

At S636, in some embodiments, each of the secondary authorization computers 104 may transfer funds to the account associated with the primary authorization computer 102. Upon detecting that all of the requested funds had been transferred to the account associated with the primary authorization computer 102, the primary authorization computer may initiate a fund transfer to the account associated with the resource provider computer 112 at S638. In some embodiments, each of the secondary authorization computers 104 may transfer funds to the account associated with the resource provider computer 112 at S638. In other embodiments, the secondary authorization computers 104 may settle directly with the resource provider computer 112 or its acquirer, without using the primary authorization computer 102.

By way of illustrative example, consider a scenario in which multiple parties attend a gathering at a restaurant. In this example, the multiple parties may wish to split a bill for the food that was ordered at the restaurant. In this scenario, one of the parties may collect payment tokens from each of the other multiple parties using an application installed on his or her mobile phone. In this scenario, the tokens may represent payment information for a number of different payment account types. The application may transmit each of the received tokens to a mobile application server (in this example, the primary authorization computer). Upon receiving the tokens, the mobile application server may generate a master token and push it to the application on the mobile device.

In this example, the owner of the mobile device may use the master token to pay the bill. The restaurant, upon receiving the master token to complete a transaction for the purchased food, would treat the master token as it would any other payment information (e.g., by generating an authorization request to an authorization entity of the master token), by providing it to an acquirer. In this illustrative example, the acquirer would seek authorization from the mobile application server (which is acting as the authorization entity) and the mobile application server would then seek authorization from authorization entities associated with each of the tokens in the set of tokens (i.e., the secondary authorization computers). In this example, once authorization is received from each of the authorization entities associated with the set of tokens, the mobile application server may generate an authorization response for the transaction to be provided to the acquirer. In this illustrative example, the user with the mobile application on his or her mobile device may collect the tokens from the other parties immediately prior to paying the bill, or far in advance. For example, the user may receive the master token before going to the restaurant. In some embodiments, the master token may be used in multiple transactions. For example, the user may utilize the same master token each time that the multiple parties meet up. If one or more of those parties are absent, the user may simply elect to assign no portion of the transaction to the absent parties.

In another illustrative example, multiple users may each share a living space and may each be responsible for a portion of rent. In this example, one of the users may collect tokens from each of his or her roommates. The user may provide these tokens to a primary authorization computer via a web browser. Upon receiving these tokens, the primary authorization computer may generate a master token and provide it to the user. The master token may subsequently be used to complete a number of transactions. For example, the master token may be used to pay for rent, utilities, and/or groceries. In some embodiments, the master token may be used to set up an auto-pay notification. In this illustrative example, each of the transaction would automatically be split up between each of the parties responsible for the transaction.

In yet another illustrative example, a single user may wish to distribute transactions between a number of credit cards or other payment accounts. For example, the user may wish to conduct a transaction for an amount that exceeds his or her current transaction limits. In this example, the user may provide tokens associated with multiple payment accounts to a primary authorization computer and may also indicate how a transaction is to be divided amongst those accounts. A master token may then be generated and associated with those payment accounts. In this example, the user may conduct a single transaction and that transaction may be divided amongst different payment accounts.

In some embodiments, the token information may represent something other than payment information. For example, multiple parties may wish to board a train or attend a concert. In this example, the multiple parties may each have a token that represents a ticket. The multiple parties may each present their separate tickets to a single user's mobile device. Information associated with the tickets may then be aggregated at a remote server, which may in turn provide a master token. In this scenario, the master token may be presented by the user in order to gain entry for each of the multiple parties to the ticketed venue.

Figure 7:
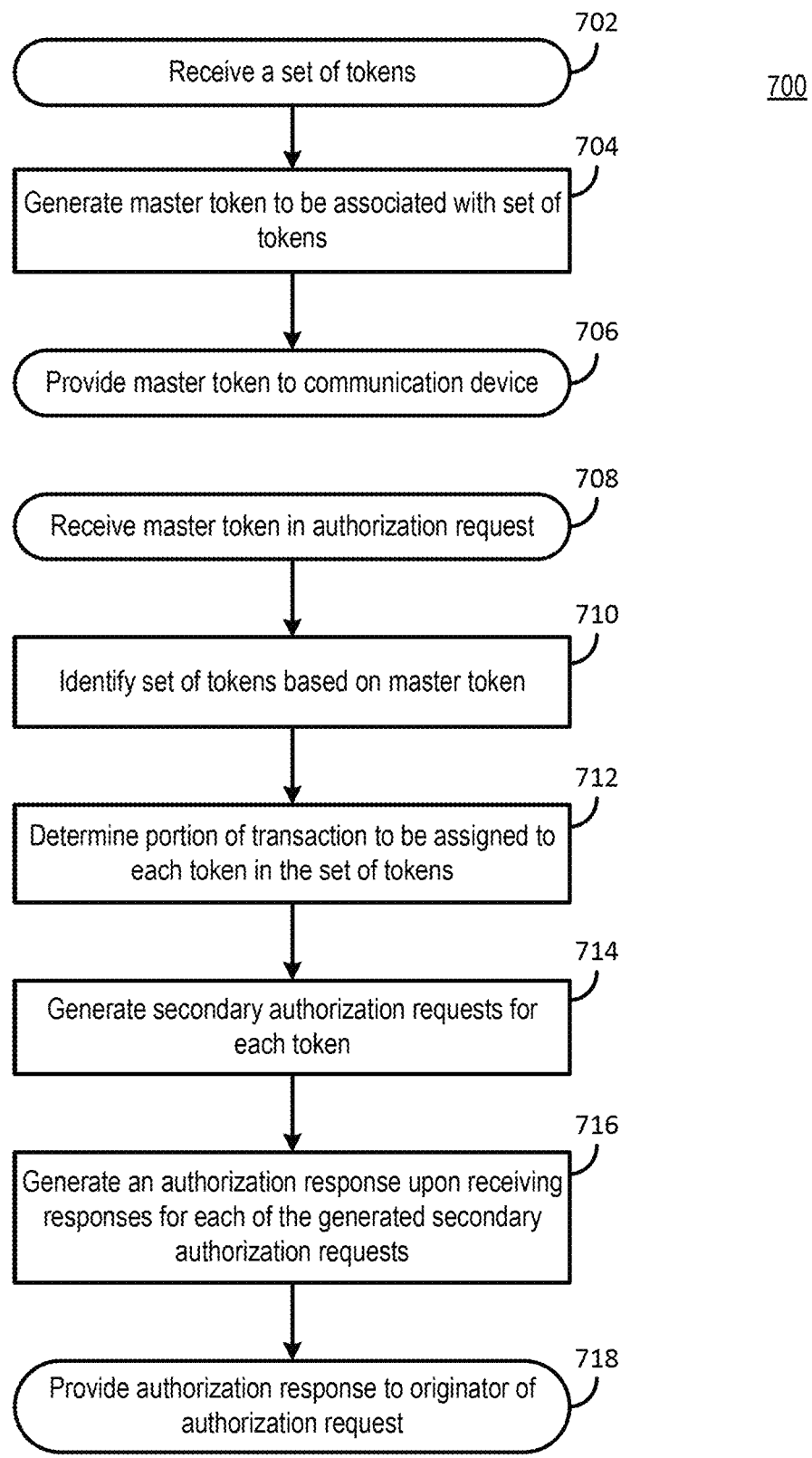
FIG. 7 depicts a flow diagram illustrating a process for generating a master token and conducting a transaction using that master token in accordance with at least some embodiments.

FIG. 7 depicts a flow diagram illustrating a process 700 for generating a master token and conducting a transaction using that master token in accordance with at least some embodiments. In some embodiments, the process 700 may be conducted by a primary authorization computer 102 depicted in FIG. 1.

The process 700 may begin at 702, when a set of initial tokens is provided to a primary authorization computer. In some embodiments, the set of initial tokens may be provided to the authorization computer by a communication device.

At 704, a master token may be generated and associated with the set of tokens. The master token may be stored in the token vault in association with the set of received tokens. For example, the master token may be stored in a database table with an indication that it is related to the set of initial tokens. The master token may be provided to a communication device at 706.

At 708, the primary authorization computer may receive an authorization request message that includes the master token. Upon receiving this authorization request message, the primary authorization computer may identify the set of initial tokens associated with the master token at 710. For example, the primary authorization computer may query a token vault for the master token.

Upon identifying the set of tokens associated with the master token, the primary authorization computer may determine a portion of the transaction to be associated with each of the tokens at 712. For each initial token in the set of initial tokens, the primary authorization computer may generate a secondary authorization request to be sent to an authorization computer associated with the initial token for the portion of the transaction associated with the initial token at 714. Each of the generated secondary authorization requests including the respective initial tokens may be transmitted to their corresponding secondary authorization computers via a transaction processing network.

The primary authorization computer may receive responses from each of the secondary authorization computers to which the secondary authorization requests have been sent. Based on these received responses, the primary authorization computer may generate an authorization response message at 716. The generated authorization response message may include an indication as to whether the transaction is to be approved or declined. Once generated, the authorization response message may be provided in response to the received authorization request at 718.

Embodiments of the invention provide for a number of technical advantages. For example, embodiments of the invention enable a group of users to split a transaction amongst the group, and allows a user to specify exact proportions to be allocated to each token. In most other transaction-splitting systems, a single user often settles the transaction with the merchant, and other users reimburse that single user for their portion. However, in these systems, the single user may end up being responsible for a larger portion of the transaction if one or more of the reimbursements are declined. In the described transaction-splitting system, preapproval is obtained for each of the additional parties prior to authorizing the transaction. This significantly reduces the risk that any single user will be responsible for a larger portion of the transaction.

Additionally, some transaction-splitting systems provide a set of tokens to a merchant for payment and require the merchant to allocate portions of the transaction to each of the provided tokens. In the described transaction-splitting system, the master token is presented to the merchant as any other token would be (e.g., via any other type of e-wallet application), which appears to the merchant as a single token. The merchant is able to treat the master token as it would any other token, and need not adopt any special software or hardware. Accordingly, the described transaction-splitting system may be used at any merchant that already accepts payment tokens. Furthermore, the described transaction-splitting system may be made token agnostic. For example, the described transaction-splitting system may accept a wide range of tokens, which enables consumers to utilize payment accounts at a merchant that may or may not be typically accepted by that merchant, because the merchant need only accept the master token.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of tokens for purchase transactions, tokens can also be used to access data or other services. For example, multiple people may have tickets or other access credentials used to gain access to a location or service (e.g., a train ride or concert). In this example, the tickets for the multiple people may be aggregated under a single master token.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   displaying, by a mobile application executed from a primary communication device of a primary user, a graphical user interface (GUI) on the primary communication device, wherein the mobile application is managed by a primary authorization computer;
   receiving, by the mobile application via the GUI, an input to create a token grouping;
   receiving, by the mobile application, one or more initial tokens from one or more secondary communication devices of one or more secondary users via a communication interface of the primary communication device configured to wirelessly communicate with the one or more secondary communication devices of the of one or more secondary users;
   obtaining, by the mobile application, the token grouping including a set of initial tokens on the GUI by:
     adding the one or more received initial tokens to the token grouping, and
     adding an initial token associated with the primary user of the primary communication device to the token grouping,
   wherein each initial token among the set of initial tokens is associated with a different account maintained by one or more authorization computers;
   transmitting, by the mobile application, the token grouping including the set of initial tokens to the primary authorization computer;
   receiving, by the mobile application of the primary communication device from the primary authorization computer, a master token associated with the initial set of tokens, wherein the master token is generated and transmitted by the primary authorization computer to the mobile application on the primary communication device;
   transmitting, by the mobile application, the master token to a terminal of a resource provider for completing a transaction with the resource provider, wherein the master token includes an indication of a portion of the transaction to be assigned to each one of the initial token aggregated into the master token, wherein the master token is transmitted to the primary authorization computer in an authorization request message for the transaction, the primary authorization computer processes the transaction using the set of initial tokens; and
   receiving, by the mobile application, a notification associated with a processing status of the transaction.

2. The method of claim 1, wherein at least one initial token of the set of initial tokens received by the primary communication device from the one or more secondary communication devices is not associated with the primary authorization computer.

3. The method of claim 1, wherein the portion of the transaction is determined based at least in part on configuration settings associated with the master token.

4. The method of claim 3, wherein the configuration settings associated with the master token are maintained by the primary authorization computer in association with an account associated with the primary communication device.

5. The method of claim 4, wherein the configuration settings are updateable by a user associated with the account.

6. The method of claim 1, wherein each token of the set of initial tokens represents a different payment account.

7. The method of claim 1, wherein the one or more initial tokens are received via a short range communication channel established between the primary communication device and the one or more secondary communication devices.

8. The method of claim 1, wherein each of the one or more initial tokens is associated with a portion of a total amount of the transaction.

9. The method of claim 1, further comprising:
   associating, by the mobile application, configuration settings with the token grouping, wherein the configuration settings indicate a portion of the transaction to be associated with each one of the set of initial tokens.

10. The method of claim 1, further comprising:
    adding, by the mobile application, a default token to the token grouping, wherein the default token is associated with a portion of the transaction that is unassigned to the set of initial tokens.

11. The method of claim 1, further comprising:
    receiving, by the mobile application, a user input to modify the token grouping.

12. The method of claim 11, wherein the user input to modify the token grouping adds or removes a token from the token grouping.

13. The method of claim 11, wherein the user input to modify the token grouping modifies the portion of the transaction assigned to one of the set of initial tokens.

14. A mobile application server device comprising:
one or more processors; and
a memory including instructions that, when executed by the one or more processors, cause the mobile application server device to support a mobile application executed from a primary communication device of a primary user, wherein the mobile application is configured to:
- display a graphical user interface (GUI) on the primary communication device, wherein the mobile application is managed by a primary authorization computer;
- receive an input, via the GUI, to create a token grouping;
- receive one or more initial tokens from one or more secondary communication devices of one or more secondary users via a communication interface of the primary communication device configured to wirelessly communicate with the one or more secondary communication devices of the of one or more secondary users;
- obtain the token grouping including a set of initial tokens on the GUI by:
  - adding the one or more received initial tokens to the token grouping, and
  - adding an initial token associated with the primary user of the primary communication device to the token grouping,
  - wherein each initial token among the set of initial tokens is associated with a different account maintained by one or more authorization computers;
- transmit the token grouping including the set of initial tokens to the primary authorization computer;
- receive, from the primary authorization computer, a master token associated with the initial set of tokens, wherein the master token is generated and transmitted by the primary authorization computer to the mobile application on the primary communication device;
- transmit the master token to a terminal of a resource provider for completing a transaction with the resource provider, wherein the master token includes an indication of a portion of the transaction to be assigned to each one of the initial token aggregated into the master token, wherein the master token is transmitted to the primary authorization computer in an authorization request message for the transaction, the primary authorization computer processes the transaction using the set of initial tokens; and
- receive a notification associated with a processing status of the transaction.

15. The mobile application server device of claim 14, wherein at least one initial token of the set of initial tokens is not associated with the primary authorization computer.

16. The mobile application server device of claim 14, wherein each token of the set of initial tokens represents a different payment account.

17. The mobile application server device of claim 14, wherein each of the one or more initial tokens is associated with a portion of a total amount of the transaction.

18. The mobile application server device of claim 14, wherein the mobile application is further configured to associate configuration settings with the token grouping, wherein the configuration settings indicate a portion of the transaction to be associated with each one of the set of initial tokens.

19. The mobile application server device of claim 14, wherein the mobile application is further configured to modify the token grouping by adding a token to the token grouping, removing a token from the token grouping, or modifying the portion of the transaction assigned to one of the set of initial tokens.

* * * * *